(12) United States Patent
Shintani

(10) Patent No.: US 7,966,641 B2
(45) Date of Patent: Jun. 21, 2011

(54) USER IDENTIFICATION USING BLUETOOTH AND AUDIO RANGING

(75) Inventor: Peter Rae Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 491 days.

(21) Appl. No.: 12/288,838

(22) Filed: Oct. 23, 2008

(65) Prior Publication Data
US 2010/0107185 A1    Apr. 29, 2010

(51) Int. Cl.
| H04H 60/33 | (2008.01) |
| H04H 60/56 | (2008.01) |
| H04N 7/16  | (2011.01) |

(52) U.S. Cl. ............... 725/141; 725/9; 725/12; 725/25; 725/153

(58) Field of Classification Search ............... 725/9, 12, 725/25, 141, 153
See application file for complete search history.

(56) References Cited

U.S. PATENT DOCUMENTS

| 6,874,037 | B1 | 3/2005 | Abram et al. |
| 7,068,165 | B2 | 6/2006 | Takahashi et al. |
| 7,130,584 | B2 | 10/2006 | Hirvonen |
| 2003/0061606 | A1* | 3/2003 | Hartwig et al. ............... 725/25 |
| 2003/0120750 | A1 | 6/2003 | Gaxiola et al. |
| 2005/0125820 | A1* | 6/2005 | Nelson et al. ............... 725/18 |
| 2006/0094359 | A1 | 5/2006 | Kim |
| 2006/0136544 | A1* | 6/2006 | Atsmon et al. ............... 709/200 |
| 2006/0172700 | A1 | 8/2006 | Wu |

FOREIGN PATENT DOCUMENTS

| EP | 1 771 003 | | 9/2005 |
| EP | 1 793 570 | A1 | 8/2008 |
| WO | WO 2006/081367 | A2 | 8/2006 |
| WO | WO 2008/028574 | A2 | 3/2008 |

OTHER PUBLICATIONS

"Cable Eyeing Bluetooth for Home Networks," Ken Freed, Media Visions Journal, Apr. 7, 2003.
"Linux Applications for Mobile Bluetooth(TM) Cell Phones: Proximity Tracking with BlueTooth," tuxmobile.org., Date unknown.
"Using Mobile Phones to Spontaneously Authenticate and Interact with Multi-Touch Surfaces," Johannes Schöning, Michael Rohs, and Antonio Krüger, May 2008.

* cited by examiner

*Primary Examiner* — Dominic D Saltarelli
(74) *Attorney, Agent, or Firm* — Miller Patent Services; Jerry A. Miller

(57) ABSTRACT

In certain embodiments, a method of automatically changing an attribute defining operation of a television system involves determining that a short range radio frequency (RF) transceiver device has entered RF range of the television system, the television system having a short range RF transceiver compatible with that of the short range RF transceiver device; binding the short range RF transceiver device to the television set to establish an identity (ID) for the short range RF transceiver device; determining that the short range RF transceiver device is within a predefined distance metric of the television system by use of an audio ping signal; at the television system, looking up a functional attribute associated with the identity; and setting a television parameter at the television using the functional attribute while the short range RF transceiver device is in the RF range as well as within the predefined distance of the television system. This abstract is not to be considered limiting, since other embodiments may deviate from the features described in this abstract.

32 Claims, 5 Drawing Sheets

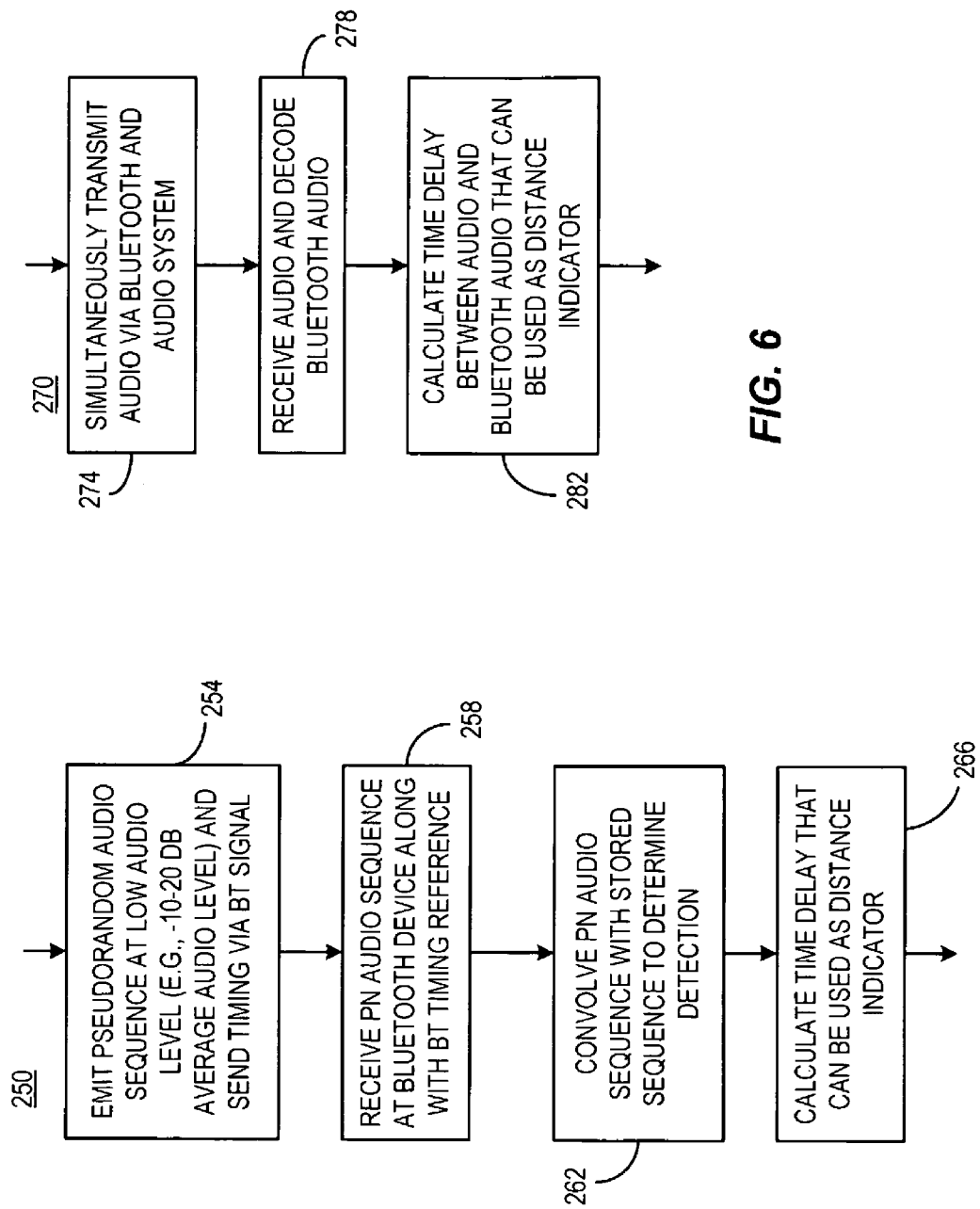

USER IDENTIFICATION USING BLUETOOTH AND AUDIO RANGING

CROSS REFERENCE TO RELATED DOCUMENTS

This application is related to U.S. patent application Ser. No. 12/288,821, filed of even date herewith on Oct. 23, 2008 to Colsey et al. entitled "User Identification and Prioritization Using Bluetooth", which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Technology designed to permit parents to control the television content that is being consumed by children has been available for several years now. It is possible to control access to content using several mechanisms, but there is generally no convenient and reliable way to automatically modify control of such access without cumbersome use of password access to parental controls. Most actual implementations associate the control of access with a hardware device that may be used by people with differing needs for content control and therefore has to be modified whenever the needs (i.e., the user) change.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 5 is an example of an implementation of audio pinging using a pseudorandom audio signal consistent with certain embodiments of the present invention.

FIG. 6 is an example of an implementation of audio pinging using television audio consistent with certain embodiments of the present invention.

DETAILED DESCRIPTION

Figure 1:
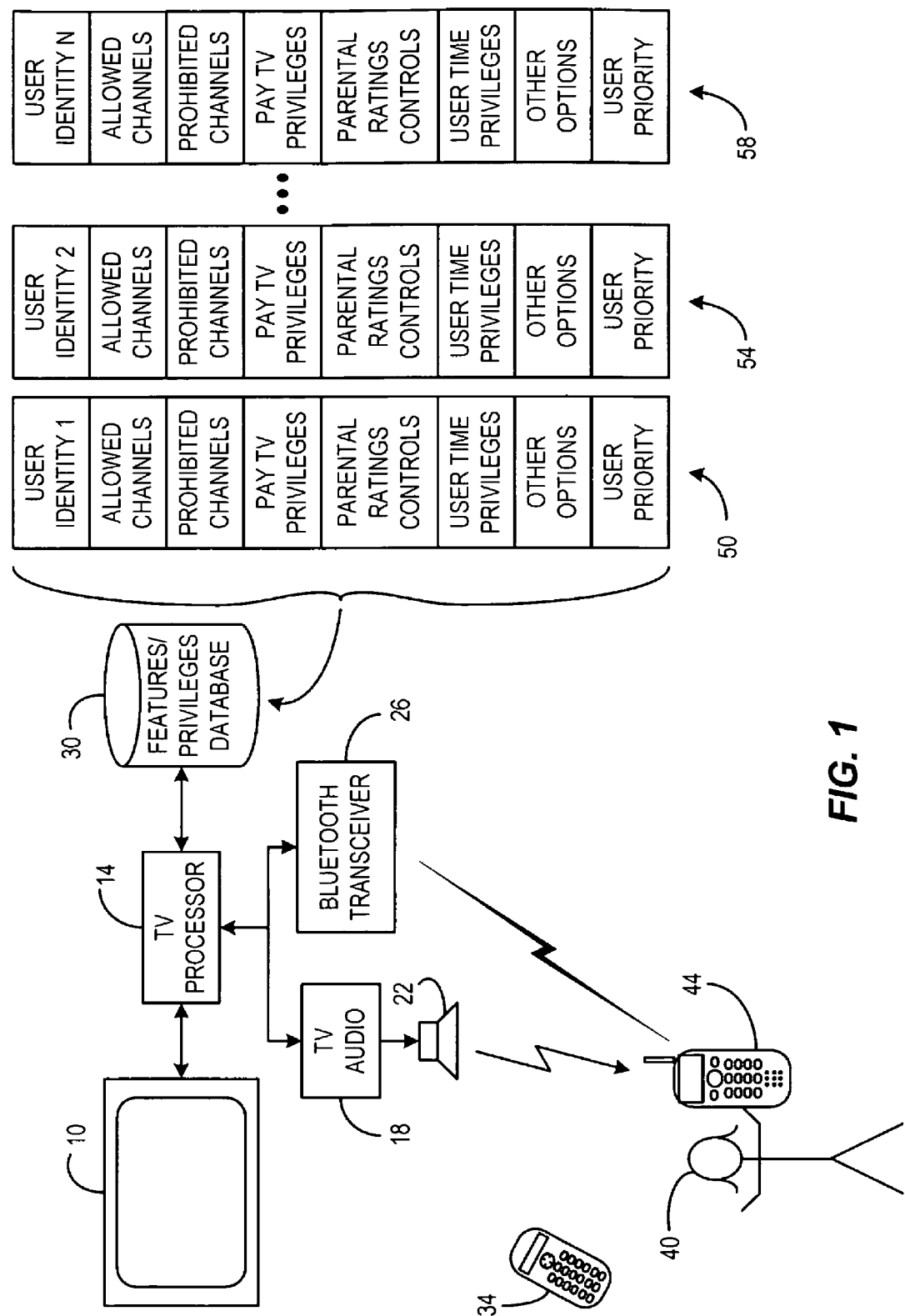
FIG. 1 illustrates an example television system with a single consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

While example embodiments and implementations consistent with the present invention are described herein in connection with a conventional television (TV) receiver, it is possible to locate or parse the functionality described among any consumer electronics device. For example, the functionality described can be implemented in a television set top box (STB) or set back box or other element of a home entertainment system or distributed across several such devices without limitation. Moreover, the database described can be located in an external or an internal storage device without limitation.

Regardless of whether controls or features are established in a TV or STB, the user generally provides a security code in order to activate premium services and/or to set or deactivate parental controls. Hence use of a remote control to enter the pass code is required. As a result, changes are not made as an automatic function, so the user may not immediately understand why something is not active or available (e.g., pay channels) since he may have forgotten that the feature was deactivated because of control changes to suit a prior user (e.g., a child).

In order to provide added convenience in customization of a consumer device such as a TV set, identification of the user can be utilized to automatically establish features and privileges. In the case of a TV set or other television receiver devices, parental settings, access to premium pay services etc., available channel lineup, etc. can be automatically controlled if the user can be identified. In embodiments consistent with certain example implementations, a television receiver is provided with a Bluetooth short range radio frequency (RF) transceiver interface. When a Bluetooth enabled device is in range of the television receiver, the television receiver identifies the user of the Bluetooth enabled device and uses a prioritization system to determine what features and privileges are active. The presence of the Bluetooth device in range of the television is refined by a distance measurement using audio ranging. In the present description, the term "Bluetooth device" is intended to mean a cellular telephone or other portable device associated with a user that is Bluetooth enabled. Technically, the television system is also a Bluetooth device since it is Bluetooth enabled, but for ease of reference, the television system will be referred to as such with the understanding that it is Bluetooth enabled. It should also be noted that while Bluetooth is used as an example because of its widespread availability and low cost, other short range RF communications standards or custom protocols could be substituted throughout without departing from the invention.

In many homes, there are multiple users who also have cell phones or other Bluetooth enabled devices (e.g., personal digital assistants—PDAs, personal computers or other devices) with Bluetooth capability. In order for Bluetooth devices to interoperate, they are bound (associated) with the complementary device(s). Hence all Bluetooth capable devices can be uniquely identified. The TV can be equipped with a Bluetooth interface (I/F), and can identify bound Bluetooth devices within range. The assumption is that each cell phone (or other Bluetooth enabled device) belongs to one member of the household, and the TV could assume that a particular user is associated with each cell phone. In the event that there are multiple phones in the vicinity, a prioritization arrangement is used for each cell phone user, with such priority assigned during setup. User identification via the presence of the user's phone eliminates the necessity for the users to manually identify themselves to the TV and use a pass code in order to access features such as parental control features that can be associated with the user. Other devices in the home can also use the unique ID of each Bluetooth enabled phone for identification.

Bluetooth has a range of about ten meters under normal circumstances, but inside a home there is great variability in this distance. Thus, presence of a Bluetooth enabled device in range of a Bluetooth enabled television receiver provides a good indication that the owner of the Bluetooth device (e.g. cell phone) is a good, but not infallible way to determine if a user is available to control a television receiver's features and privileges including parental control. However, there are many circumstances where the mere presence of a Bluetooth device within range of a television receiver may not be an adequate indication that the associated user is in control of the television's operation (e.g., for purposes of assuring that the content is appropriate to all viewers in the room). For example, a Bluetooth device with high privileges may be in a room upstairs, downstairs or adjacent the room containing the television and remain in range, without the user associated with the Bluetooth device actually being in control and supervising use of the television system.

Consider first the illustration of FIG. 1. In this illustration, a television system has a display 10 that operates under control of a TV processor 14 to provide a picture and further has a TV audio circuit 18 that produces audio to one or more speakers or to an external audio system represented by 22, all of which may operate under control of, or communicate with TV processor 14. The TV system further incorporates a Bluetooth transceiver 26. The various control features and privileges are programmed into the television receiver's TV processor 14 and are stored in memory in an internal or external database 30. In accord with certain embodiments, a default set of features may be enabled in the event no clear controlling entity can be established, or upon power up of the television system (i.e., having highest restrictions—no pay TV, only G rated content, limited channels, etc.). The basic control of the system can be carried out using remote controller 34 in a more or less conventional manner, and the remote controller 34 can be used to override controls that are automatically engaged according to the embodiments disclosed using pass codes if desired.

When no entity having a Bluetooth enabled and recognized device is present, a default set of controls, features and privileges are in place. It is preferred that such default be user programmable, or be established to be appropriate for the viewer requiring the most protection from undesirable content (i.e., the youngest child that might operate or use the system).

Now consider if user 40 enters the room or otherwise comes within Bluetooth range carrying a Bluetooth enabled device 44 such as a cellular telephone. If one assumes that user 40 is an older teenager, perhaps the default controls, features and privileges are unnecessarily restrictive, as decided by the parent. In this case, the user 40's proximity to the television as established when the user is within Bluetooth RF range by the binding of the Bluetooth device 44 with the television system. The Bluetooth transceiver automatically identifies the user 40 as one of the registered users 50, 54 through 58 having a number of attributes such as an identity, a set of allowed channels and/or prohibited channels, pay TV privileges, parental controls, viewing time privileges and other options along with a priority that determines whether user 40's privileges supersede the current privileges or those of other users. The information associated with each user can be stored in database 30, which is expanded in this illustration for clarity.

However, it is noted that if a small child is in the room, user 40's privileges may not be suitable. It is further noted that the presence of a Bluetooth device within range could also mean that the user 40 is in an adjacent room, upstairs or downstairs and have no knowledge or ability to monitor the small child's use of the television system. For this reason, proximity of a Bluetooth device 44 with the television system can often be an inadequate gauge for use by the television system of whether it is safe to assume that the television system's use is appropriately monitored. Hence, in accord with certain implementations, a further safeguard is provided. This safeguard involves not only the presence within range of the Bluetooth device 44, but also a distance measurement that can be custom tailored for the particular configuration of the room containing the television system. For this function, audio ranging is provided wherein a ping signal transmitted by the television system's audio system is used. The fact that audio travels slower than radio frequency signals can be used as a rough distance gauging mechanism to assure that the Bluetooth device controlling the television system is in fact close enough to be in the room.

It is noted that the preferred embodiment uses the television audio as the source of the audio ping (since the system is already in place, and since the Bluetooth device (assuming a cellular telephone) already has a microphone). However, the reverse configuration can also be devised without departing from embodiments consistent with the present invention by providing a microphone on the TV system and using the Bluetooth device as the source of the audio ping signal. Other variations will occur to those skilled in the art.

Figure 2:
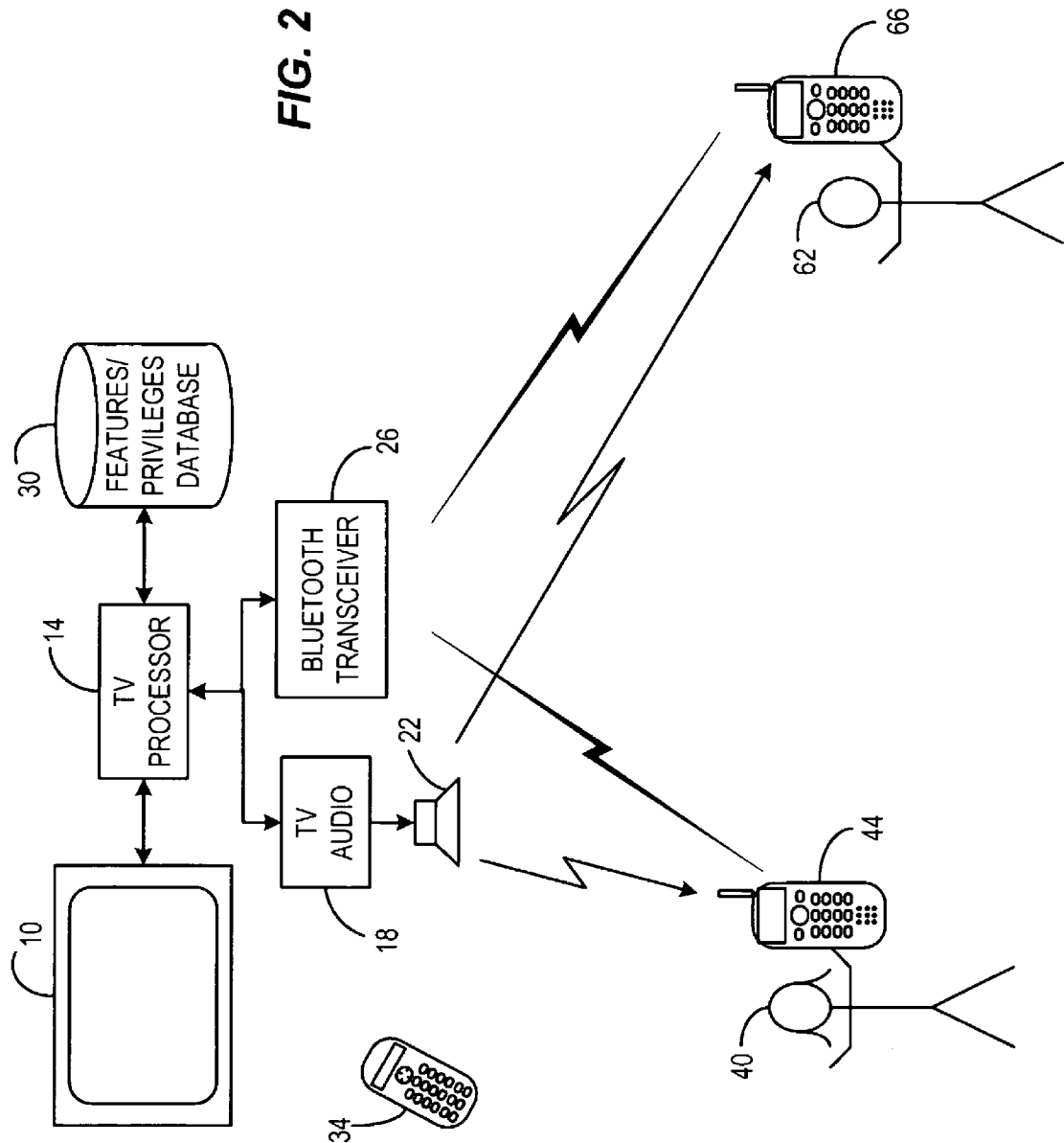
FIG. 2 illustrates an example television system with multiple users consistent with certain embodiments of the present invention.

In FIG. 2, the details of an example database are omitted, but a second user 62 is shown with a second Bluetooth enabled device such as a cellular telephone. For purpose of this description, we can first assume that user 62 has greater priority by virtue of association with Bluetooth device 66 than user 40. If they are both in range of the Bluetooth transceiver 26, and both within the user established range of the television receiver as determined by audio ranging techniques, then the controls associated with user 62 are set by the television system. However, if we assume that user 62 is further from the television system than user 40, and although in Bluetooth range user 62 is not within the established audio range, the television system assumes that user 62 is not controlling the content and the controlling user will be set to the identity associated with user 40.

Hence, in order for a user to have control of the controls, preferences and settings of the television system, the user 1) is in Bluetooth range, 2) is within the prescribed range as determined by audio ranging, and 3) has the highest priority of the users meeting criteria 1) and 2). This set of protections has the added advantage that if a lower priority user attempts to take advantage of close proximity of a higher priority user's Bluetooth device by manipulation of the audio, the attempt will fail. An example is if a child or teen is clever enough to attempt to view content that is not normally permitted by taking advantage of a cellular telephone in an adjacent room, or inadvertently left unattended, and attempts to do so by muting or lowering the volume, the priority will default to the default controls and privileges (which can be set to a minimum set of privileges).

If user 40 has priority and user 62 (with higher priority) enters the room, the television system reverts to the priority user (62) and relies either upon the user 62 to change programming or permit the continued viewing of the current content. In the event user 62 leaves the room, the current content can either continue to play until the end or if the current content is outside user 40's privileges, can be halted, paused or stopped. These actions can be defined by the manufacturer or be user selectable at setup.

Thus, as described, by utilizing the fact that sound travels slower than radio waves, if there is one or multiple cell phones in the vicinity of the TV, the TV or the phone can audibly ping the phone or TV, and hence the approximate distance to each phone from the television can be estimated. If the parent's phone or other higher priority phone is out of audible range, then the TV's personality is adjusted to that of the other phone which is within audio pinging range or to a default personality. While Bluetooth is used as an example, the same principles can be implemented using other short range wireless communications technologies. Additionally, transmission and reception can could be used for ranging.

Figure 3A:
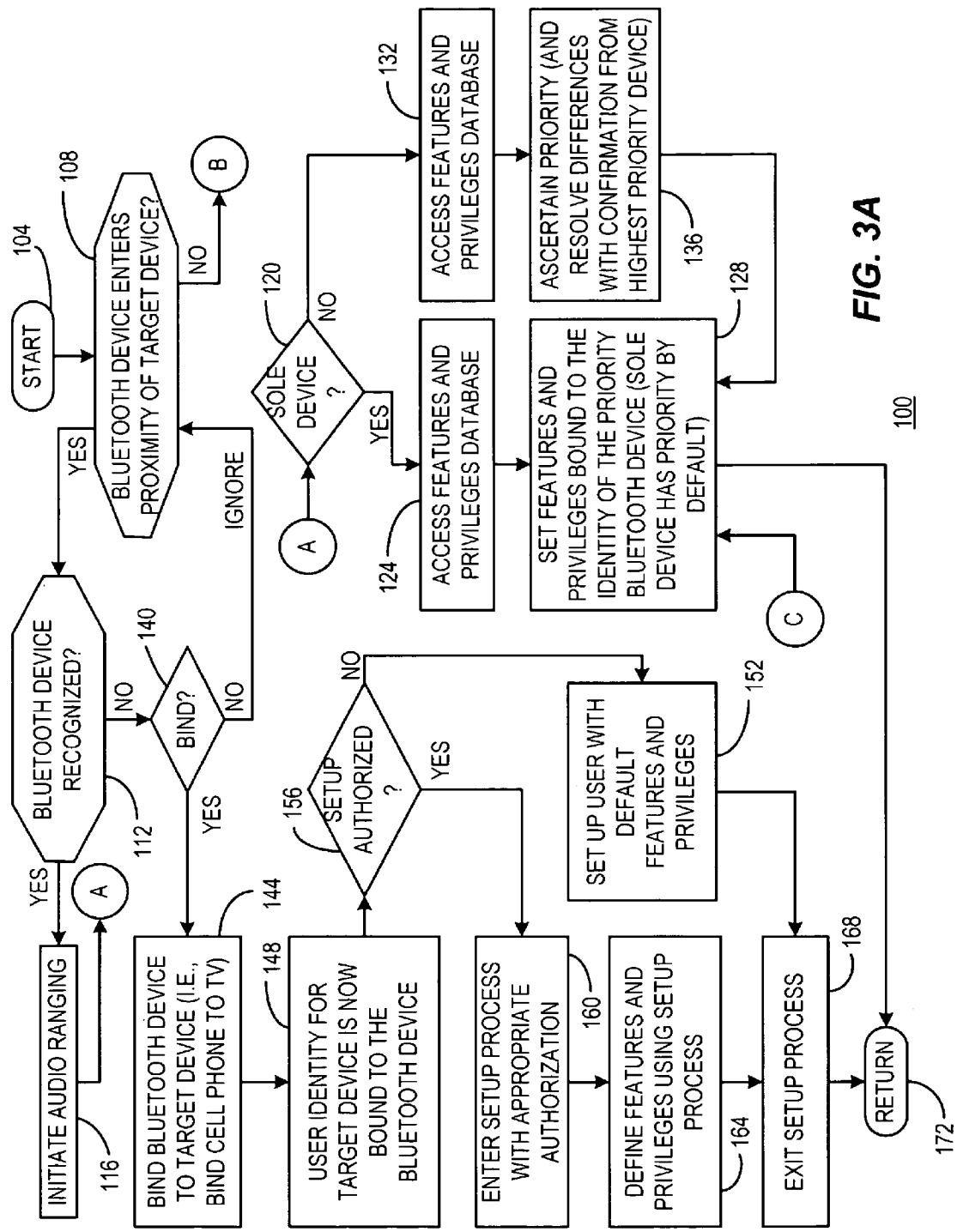
FIG. 3, which is made up of FIGS. 3A and 3B, is an example flow chart of operation consistent with certain implementations of the present invention.
Figure 3B:
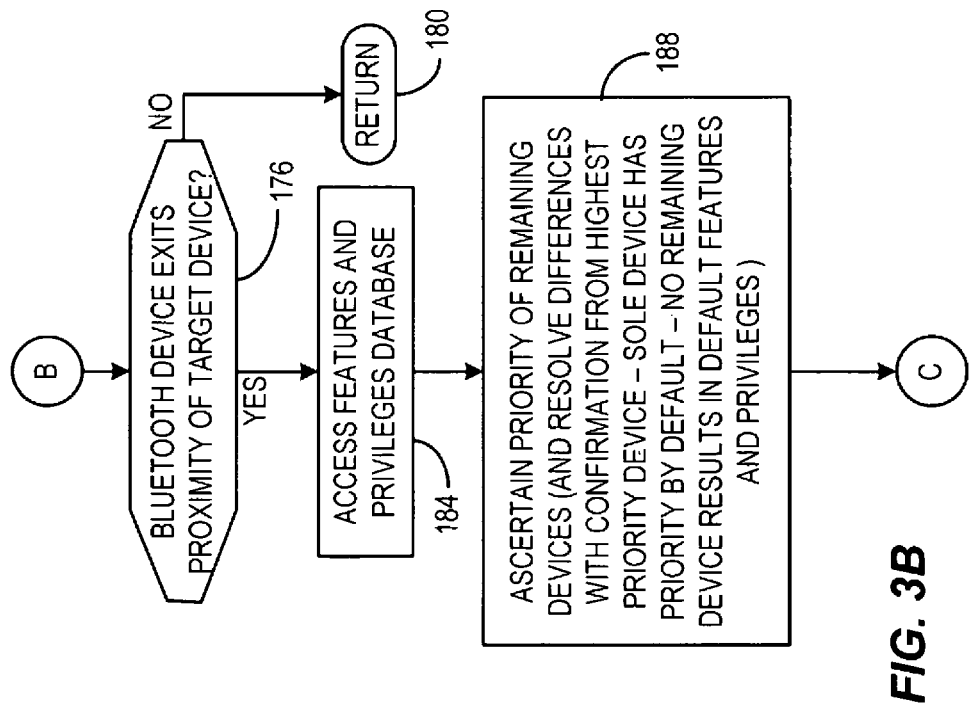

The actions described above can be carried out using TV processor 14 (which may in fact be implemented as multiple processors or hardware equivalents) operating under program control. FIG. 3 made up of FIGS. 3A and 3B depict one example method 100 of operation of the system as described above starting at 104. If a Bluetooth device enters proximity of the target device (e.g., the television system, STB, television, etc.) at 108, and the Bluetooth device is recognized at 112, an audio ranging process begins at 116, as will be explained later. If the Bluetooth device is the sole device present at 120, then the device is identified and its associated features and privileges are accessed in the database 30 at 124. Since it is the sole Bluetooth device, it has priority by default and hence the privileges associated with that identity are established for the television system at 128.

However, if another device is present and thus the device is not the sole device at 120, that features and privileges database is accessed at 132 to determine the priority of the Bluetooth device at 136. The set of features associated with the identity of the highest priority device present are then set at 128. The priority, as discussed above, is dependent not only on the presence of a Bluetooth device within RF range, but also within range as defined by the audio ranging.

If a Bluetooth device enters Bluetooth range but is not recognized at 112, the device may be associated (bound) with the television system provided such binding is approved. Approval can be via entry of an approval code using the remote controller 34, or by other suitable action taken by an entity having high enough priority. If no binding is to occur at 140, the presence of the Bluetooth device is ignored unless an entity with high enough priority intervenes at a later time to bind the Bluetooth device.

If the Bluetooth device is to be bound at 140 with the television system, a binding procedure is initiated in which a set of predefined user actions using the remote controller or other actions are implemented to associate the Bluetooth device with a new identity at 144. This can be as simple has having the Bluetooth device within range and having a user with high enough priority enter a setup screen and answer a series of questions to identify the user after which the user is bound to the television system at 148.

In one example implementation, a relatively low priority can bind a Bluetooth device, but the device's privileges and features are set at a default value at 152 unless the setup is authorized at 156 by an entity with high enough priority. If any setup other than the default (which may be high priority user configured) is desired, a setup process is entered at 160 where features, controls and privileges for the new Bluetooth device can be defined at 164 prior to exiting the setup process at 168. The process returns to the start at 172 to await entry or departure of an new Bluetooth device.

If a Bluetooth device is present, but none is currently entering range, the system checks to see if a Bluetooth device is exiting range at 176 (Bluetooth or audio range or both). In this manner, the system continually looks for entry or exit of proximity of Bluetooth devices, with entry and exit for purposes of assuming control being defined by both Bluetooth and audio range in a loop as indicated by the return to the start at 180. If a Bluetooth device exits proximity (audio or RF) at 176, the features and privileges database is accessed at 184 and a determination is made at 188 as to which remaining (if any) Bluetooth device has priority. That device with highest priority is then given control at 128. If all devices have exited, then the default privileges and features are set at 128.

Those skilled in the art will appreciate upon consideration of the present teachings that fading of RF or audio signals by virtue of movement within a room or other changing conditions can result in a momentary loss or interference with audio or RF signals and thus a temporary failure of the system to identify all Bluetooth devices that are present. To combat this problem, it may be desirable to implement delays at appropriate points in the process so that priority and control are not constantly shifting. For example, a several second delay can be implemented prior to making a priority change, and a recheck done before a change takes place. Other variations that introduce hysteresis into the decision making process will occur to those skilled in the art upon consideration of the present teachings.

Figure 4:
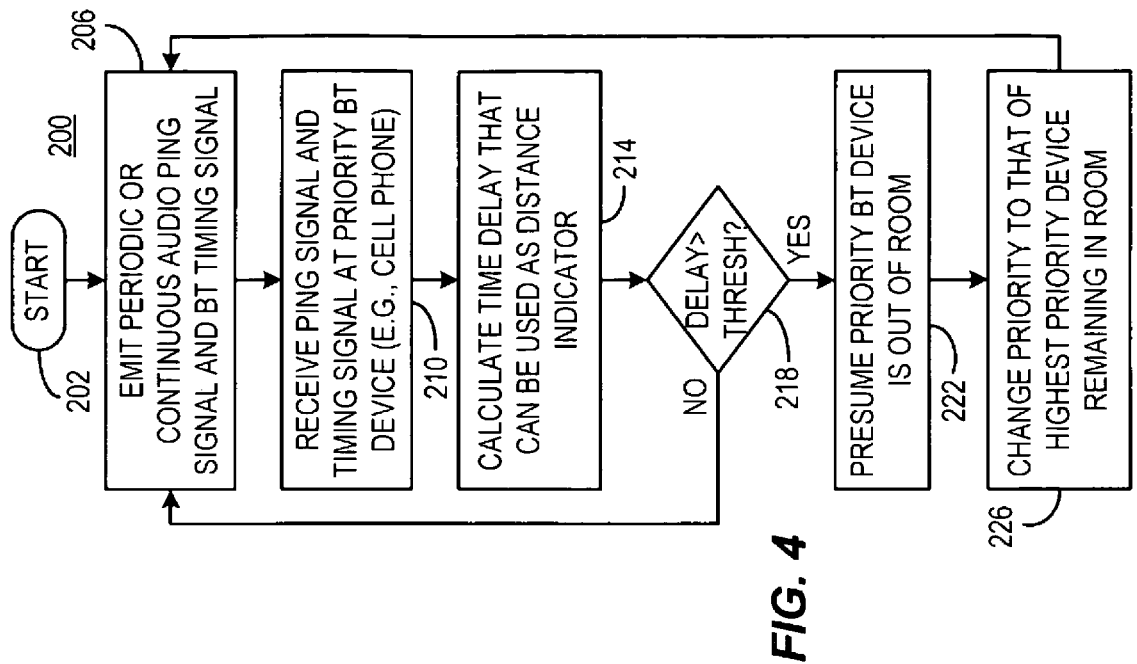
FIG. 4 is an example of an implementation of audio pinging consistent with certain embodiments of the present invention.

One implementation of the audio ranging process depicted generally as 116 in FIG. 3 is shown in process 200 of FIG. 4 starting at 202 after which any suitable periodic or continuous audio ping signal is emitted by the television system's audio along with a Bluetooth transmission by the television system of timing information at 206. In various implementations, the audio ping signal can be in the form of a distinctive tone or combination of multiple tones in sequence or simultaneously, a low to higher or high to lower frequency "chirp" signal or other signal that can be distinctively received at the Bluetooth device (or as noted above, at the television system). Such signals can be generated by the processor 14 or by other circuitry present in the TV audio block 18. The ping signal and timing signals are received at the Bluetooth (BT) device at 210. Since the RF Bluetooth signal will travel much faster than the speed of sound, the time difference between receipt of the Bluetooth timing signal and the audio signal can be used to gauge the amount of distance the Bluetooth device is from the television system. The source of the audio content going to the speakers can be used to provide a reference time so that the time the audio is being sent is known at the television system. A digital signal processor or other circuitry can track this time and use the timing information in connection with the Bluetooth signal information to determine the round trip delay in order to determine distance to the Bluetooth device in certain implementations. Other variations will occur to those skilled in the art upon consideration of the present teachings.

The time difference between the timing signal and the audio signal need not be actually computed to define an actual distance at 214, but can be calibrated to a range of values serving as a distance metric that equates to the user's presence in or absence from the room. The audio ping can be of a preset volume that is low enough to not be an annoyance but high enough to function consistently. Alternatively, the audio level can be a set value that will be approximately 10-20 dB below the average volume, or may be a particular volume associated with a volume control setting.

The user can then define a threshold for the volume based upon the room characteristics, typical listening volume, Bluetooth device sensitivity, etc. so that the system will consider the Bluetooth device to be present when it actually is by comparison of the delay with the threshold at 218. Since these functions cannot be predefined for every possible room, the user can change the threshold based upon an on-screen indicator that the system considers the device to be in the room or not. That is, the user can place the device at various positions at the extremes of the room and set the threshold so that it is only exceeded when the Bluetooth device is actually in the room. Adjustments in the volume of the audio ping may also require fine tuning so as to define the boundaries of the room. These functions can be set during the setup process. It is noted that the presence of walls of a room will generally produce an abrupt reduction in sound pressure level when the Bluetooth device is outside the room versus inside the room making setting of an appropriate threshold relatively easy by assuring that there is essentially no reception of the audio ping outside the room and an acceptable level of reception of audio ping inside the room.

When the delay fails to exceed the threshold at 218, control returns to 206 and the Bluetooth device is considered within the room and thus in control if it has priority and is also within Bluetooth RF range. If the delay exceeds the threshold, the device is presumed to have left the room at 222 at which point the priority is changed to that of the highest remaining Bluetooth device in the room at 226 as previously described. The time difference noted above and below can be readily computed at the Bluetooth device and then sent back to the television system for comparison with the threshold, or the results of a threshold comparison can be carried out at the Bluetooth device with the results sent back to the television system.

Another audio ranging technique is described in connection with process 250 of FIG. 5. In this process, a pseudorandom audio sequence is emitted by the audio system at a low audio level near the noise floor or at least about 10-20 dB below the TV audio level at 254 along with a Bluetooth timing signal. The timing signal and the pseudorandom audio sequence are received at the Bluetooth device at 258 and the pseudorandom audio sequence is convolved with a stored sequence to determine proper receipt of the audio pseudorandom sequence at 262. The time delay can be calculated from this information at 266. As previously noted, an exact distance measurement is not necessary, but only a figure of merit in the form of a delay that can be related to distance from the televisions system.

Another ranging technique is shown in FIG. 6. In this implementation shown in process 270, the television program's audio signal itself, or some distinctive aspect thereof can be used as the ping signal. In this case, an audio sample (or all audio) can be continuously transmitted both using the conventional audio system and using RF Bluetooth at 274. Both the audio and the Bluetooth version of the audio are received by the Bluetooth device at 278. Since the Bluetooth version will arrive sooner than the audio version, the time delay can again be calculated an used as a distance indicator at 282. Upon consideration of the present teachings, many variations will occur to those skilled in the art.

Thus, in certain embodiments, a method of automatically changing an attribute defining operation of a television system involves determining that a short range radio frequency (RF) transceiver device has entered RF range of the television system, the television system having a short range RF transceiver compatible with that of the short range RF transceiver device; binding the short range RF transceiver device to the television set to establish an identity (ID) for the short range RF transceiver device; determining that the short range RF transceiver device is within a predefined distance metric of the television system by use of an audio ping signal; at the television system, looking up a functional attribute associated with the identity; and setting a television parameter at the television using the functional attribute while the short range RF transceiver device is in the RF range as well as within the predefined distance of the television system.

In certain embodiments, the method further involves determining that a plurality of short range RF devices are within RF range of the television system and that the plurality of short range RF devices are also within the predefined distance; determining a priority of each of the plurality of short range RF devices; and setting the television parameter according to an attribute associated with a short range RF device having highest priority. In certain embodiments, a plurality of functional attributes is associated with the identity, and the plurality of attributes includes one or more usage controls and privileges attributes. In certain embodiments, the functional attribute comprises a parental control attribute. In certain embodiments, the short range RF transceiver comprises a Bluetooth compatible transceiver. In certain embodiments, the short range RF transceiver forms a part of a cellular telephone. In certain embodiments, the audio pinging is carried out using an audio system of the television system as an audio pinging source, and using a microphone of the cellular telephone as an audio receiver. In certain embodiments, an arrival time of the audio ping signal is compared with an RF timing signal to determine the distance metric. In certain embodiments, the ping signal comprises at least one of a distinctive tone or combination of multiple tones in sequence or simultaneously, a low to higher frequency chirp, or a high to lower frequency chirp signal. In certain embodiments, the audio ping signal comprises a pseudorandom audio signal. In certain embodiments, the pseudorandom audio signal is convolved with a stored pseudorandom audio signal to determine its presence and compared to a transmitted RF timing signal to determine the distance metric. In certain embodiments, the audio ping signal comprises at least a portion of the normal television audio. In certain embodiments, the at least a portion of the normal television signal is compared with a version of the at least a portion of the normal television signal transmitted via the television system's short range RF transceiver.

Another method of automatically changing an attribute defining operation of a television system involves determining that a Bluetooth compatible cellular telephone has entered Bluetooth radio frequency (RF) range of the television system, the television system having a Bluetooth compatible transceiver device; binding the Bluetooth compatible cellular telephone to the television set to establish an identity (ID) for the cellular telephone; determining that the cellular telephone is within a predefined distance metric of the television system by use of an audio ping signal; at the television system, looking up a plurality of functional attribute associated with the identity, wherein the plurality of attributes include one or more usage controls and privileges attributes; setting a plurality of television parameters at the television using the functional attributes while the cellular telephone is within Bluetooth RF range as well as within the predefined distance of the television system.

In certain embodiments, the method further involves determining that a plurality of Bluetooth compatible devices are within Bluetooth RF range of the television system and that the plurality of Bluetooth devices are also within the predefined distance; determining a priority of each of the plurality of Bluetooth devices; and setting the television parameter according to attributes associated with a Bluetooth device having highest priority. In certain embodiments, the functional attributes comprise parental control attributes. In certain embodiments, the audio pinging is carried out using an audio system of the television system as an audio pinging source, and using a microphone of the cellular telephone as an audio receiver. In certain embodiments, an arrival time of the audio ping signal is compared with an RF timing signal to determine the distance metric. In certain embodiments, the ping signal comprises at least one of a distinctive tone or combination of multiple tones in sequence or simultaneously, a low to higher frequency chirp, or a high to lower frequency chirp signal. In certain embodiments, the audio ping signal comprises a pseudorandom audio signal, and wherein the pseudorandom audio signal is convolved with a stored pseudorandom audio signal to determine its presence and compared to a transmitted RF timing signal to determine the distance metric. In certain embodiments, the audio ping signal comprises at least a portion of the normal television audio, and wherein the at least a portion of the normal television signal is compared with a version of the at least a portion of the normal television signal transmitted via the television system's short range RF transceiver.

A tangible computer readable electronic storage medium can instructions which, when executed on one or more programmed processors, carry out any of the methods above.

A television system consistent with certain embodiments has a short range radio frequency (RF) transceiver device forming a part of the television system. A programmed processor determines that a short range RF transceiver device has entered RF range of the television system. The processor binds the short range RF transceiver device to the television set to establish an identity (ID) for the short range RF transceiver device and determines that the short range RF transceiver device is within a predefined distance metric of the television system by use of an audio ping signal. The processor looks up a functional attribute associated with the identity and sets a television parameter at the television using the functional attribute while the short range RF transceiver device is in the RF range as well as within the predefined distance of the television system.

In certain embodiments of the television system, the processor determines that a plurality of short range RF devices are within RF range of the television system that the plurality of short range RF devices are also within the predefined distance. The processor determines a priority of each of the plurality of short range RF devices. The processor sets the television parameter according to an attribute associated with a short range RF device having highest priority. In certain embodiments, a plurality of functional attributes is associated with the identity, and wherein the plurality of attributes includes one or more usage controls and privileges attributes. In certain embodiments, the functional attribute comprises a parental control attribute. In certain embodiments, the short range RF transceiver comprises a Bluetooth compatible transceiver. In certain embodiments, the short range RF transceiver forms a part of a cellular telephone. In certain embodiments, the audio pinging is carried out using an audio system of the television system as an audio pinging source, and using a microphone of the cellular telephone as an audio receiver. In certain embodiments, an arrival time of the audio ping signal is compared with an RF timing signal to determine the distance metric. In certain embodiments, the ping signal comprises at least one of a distinctive tone or combination of multiple tones in sequence or simultaneously, a low to higher frequency chirp, or a high to lower frequency chirp signal. In certain embodiments, the audio ping signal comprises a pseudorandom audio signal. In certain embodiments, the pseudorandom audio signal is convolved with a stored pseudorandom audio signal to determine its presence and compared to a transmitted RF timing signal to determine the distance metric. In certain embodiments, the audio ping signal comprises at least a portion of the normal television audio. In certain embodiments, the at least a portion of the normal television signal is compared with a version of the at least a portion of the normal television signal transmitted via the television system's short range RF transceiver.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A method of automatically changing an attribute defining operation of a television system, comprising:
    determining that a short range radio frequency (RF) transceiver device has entered RF range of the television system, the television system having a short range RF transceiver compatible with that of the short range RF transceiver device;
    binding the short range RF transceiver device to the television set to establish an identity (ID) for the short range RF transceiver device;
    determining that the short range RF transceiver device is within a predefined distance metric of the television system by use of an audio ping signal, wherein an arrival time of the audio ping signal is compared with an RF timing signal to determine the distance metric;
    at the television system, looking up a functional attribute associated with the identity; and
    setting a television parameter at the television using the functional attribute while the short range RF transceiver device is in the RF range as well as within the predefined distance of the television system.

2. The method according to claim 1, further comprising:
    determining that a plurality of short range RF devices are within RF range of the television system and that the plurality of short range RF devices are also within the predefined distance;
    determining a priority of each of the plurality of short range RF devices; and
    setting the television parameter according to an attribute associated with a short range RF device having highest priority.

3. The method according to claim 1, wherein a plurality of functional attributes are associated with the identity, and wherein the plurality of attributes include one or more usage controls and privileges attributes.

4. The method according to claim 1, wherein the functional attribute comprises a parental control attribute.

5. The method according to claim 1, wherein the short range RF transceiver comprises a Bluetooth compatible transceiver.

6. The method according to claim 5, wherein the short range RF transceiver forms a part of a cellular telephone.

7. The method according to claim 5, wherein the audio pinging is carried out using an audio system of the television system as an audio pinging source, and using a microphone of the cellular telephone as an audio receiver.

8. The method according to claim 1, wherein the ping signal comprises at least one of a distinctive tone or combination of multiple tones in sequence or simultaneously, a low to higher frequency chirp, or a high to lower frequency chirp signal.

9. The method according to claim 1, wherein the audio ping signal comprises a pseudorandom audio signal.

10. The method according to claim 9, wherein the pseudorandom audio signal is convolved with a stored pseudorandom audio signal to determine its presence and compared to a transmitted RF timing signal to determine the distance metric.

11. The method according to claim 1, wherein the audio ping signal comprises at least a portion of the normal television audio.

12. The method according to claim 11, wherein the at least a portion of the normal television signal is compared with a version of the at least a portion of the normal television signal transmitted via the television system's short range RF transceiver.

13. A tangible computer readable electronic storage medium storing instructions which, when executed on one or more programmed processors, carry out a method according to claim 1.

14. A method of automatically changing an attribute defining operation of a television system, comprising:
    determining that a Bluetooth compatible cellular telephone has entered Bluetooth radio frequency (RF) range of the television system, the television system having a Bluetooth compatible transceiver device;
    binding the Bluetooth compatible cellular telephone to the television set to establish an identity (ID) for the cellular telephone;
    determining that the cellular telephone is within a predefined distance metric of the television system by use of an audio ping signal, wherein an arrival time of the audio ping signal is compared with an RF timing signal to determine the distance metric;
    at the television system, looking up a plurality of functional attribute associated with the identity, wherein the plurality of attributes include one or more usage controls and privileges attributes;
    setting a plurality of television parameters at the television using the functional attributes while the cellular telephone is within Bluetooth RF range as well as within the predefined distance of the television system.

15. The method according to claim 14, further comprising:
    determining that a plurality of Bluetooth compatible devices are within Bluetooth RF range of the television system and that the plurality of Bluetooth devices are also within the predefined distance;
    determining a priority of each of the plurality of Bluetooth devices; and
    setting the television parameter according to attributes associated with a Bluetooth device having highest priority.

16. The method according to claim 14, wherein the functional attributes comprise parental control attributes.

17. The method according to claim 14, wherein the audio pinging is carried out using an audio system of the television system as an audio pinging source, and using a microphone of the cellular telephone as an audio receiver.

18. The method according to claim 14, wherein the ping signal comprises at least one of a distinctive tone or combination of multiple tones in sequence or simultaneously, a low to higher frequency chirp, or a high to lower frequency chirp signal.

19. The method according to claim 14, wherein the audio ping signal comprises a pseudorandom audio signal, and wherein the pseudorandom audio signal is convolved with a stored pseudorandom audio signal to determine its presence and compared to a transmitted RF timing signal to determine the distance metric.

20. The method according to claim 14, wherein the audio ping signal comprises at least a portion of the normal television audio, and wherein the at least a portion of the normal television signal is compared with a version of the at least a portion of the normal television signal transmitted via the television system's short range RF transceiver.

21. A television system, comprising: a short range radio frequency (RF) transceiver device forming a part of the television system;
a programmed processor that determines that a short range RF transceiver device has entered RF range of the television system;
the processor binding the short range RF transceiver device to the television set to establish an identity (ID) for the short range RF transceiver device;
the processor determining that the short range RF transceiver device is within a predefined distance metric of the television system by use of an audio ping signal, wherein an arrival time of the audio ping signal is compared with an RF timing signal to determine the distance metric;
the processor looking up a functional attribute associated with the identity; and
the processor setting a television parameter at the television using the functional attribute while the short range RF transceiver device is in the RF range as well as within the predefined distance of the television system.

22. The television system according to claim 21, further comprising:
the processor determining that a plurality of short range RF devices are within RF range of the television system and that the plurality of short range RF devices are also within the predefined distance;
the processor determining a priority of each of the plurality of short range RF devices; and
the processor setting the television parameter according to an attribute associated with a short range RF device having highest priority.

23. The television system according to claim 21, wherein a plurality of functional attributes are associated with the identity, and wherein the plurality of attributes include one or more usage controls and privileges attributes.

24. The television system according to claim 21, wherein the functional attribute comprises a parental control attribute.

25. The television system according to claim 21, wherein the short range RF transceiver comprises a Bluetooth compatible transceiver.

26. The television system according to claim 25, wherein the short range RF transceiver forms a part of a cellular telephone.

27. The television system according to claim 25, wherein the audio pinging is carried out using an audio system of the television system as an audio pinging source, and using a microphone of the cellular telephone as an audio receiver.

28. The television system according to claim 21, wherein the ping signal comprises at least one of a distinctive tone or combination of multiple tones in sequence or simultaneously, a low to higher frequency chirp, or a high to lower frequency chirp signal.

29. The television system according to claim 21, wherein the audio ping signal comprises a pseudorandom audio signal.

30. The television system according to claim 29, wherein the pseudorandom audio signal is convolved with a stored pseudorandom audio signal to determine its presence and compared to a transmitted RF timing signal to determine the distance metric.

31. The television system according to claim 21, wherein the audio ping signal comprises at least a portion of the normal television audio.

32. The television system according to claim 21, wherein the at least a portion of the normal television signal is compared with a version of the at least a portion of the normal television signal transmitted via the television system's short range RF transceiver.

* * * * *